3,457,208
ALKALINE FLOOR POLISH CONTAINING POLYVALENT METAL CHELATE
Charles I. Sullivan, Melrose, and Francis L. McCarthy, Quincy, Mass., assignors to A. E. Staley Manufacturing Company, Decatur, Ill., a corporation of Delaware
No Drawing. Filed Apr. 8, 1966, Ser. No. 541,095
Int. Cl. C09g 1/10, 1/16
U.S. Cl. 260—28.5                      11 Claims

ABSTRACT OF THE DISCLOSURE

An alkaline detergent resistant floor polish composition comprising a water soluble polyvalent metal chelate of an organic acid and an aqueous emulsion of synthetic addition copolymer, said copolymer comprising from about 2 to 25% by weight of an alpha,beta-ethylenically unsaturated carboxylic acid.

---

This invention relates to a new floor polish. More particularly, this invention relates to a new floor polish which is neither dulled nor removed by soap (or detergent) and water, but which can be readily removed from the flooring with aqueous ammoniacal cleaners. This invention is also concerned with a method for treating and preserving flooring materials.

For many years floor polish formulators have been searching for floor polishes which are capable of withstanding detergent and/or soap and water scrubbing without removal or dulling but which could be removed safely with a suitable remover. Various approaches have been taken to this problem. For example, polymers based on aminoalkyl (meth)acrylate monomers have been introduced. Floor polishes based on these polymers, as originally offered to the trade, were supposed to be removable with an acidic stripper. However, many of the acidic strippers had deleterious effects on the flooring and/or were incapable of completely removing the applied polishes after they had aged a month or more. Somewhat better removability has been obtained using machine scrubbing with standard tripolyphosphate cleaners. However, such systems are generally not suitable for home use by housewives.

Our application Ser. No. 471,405, now U.S. Patent 3,403,119, discloses a new concept in detergent resistant floor polishes utilizing acidic floor polishes capable of removal with special removers (aqueous alkaline systems containing an organic solvent). The floor polishes disclosed in Ser. No. 471,405 have met with sizable commercial acceptance for industrial use. However, there has developed a need for similar systems wherein common household cleaning materials can be used to remove the applied floor polish. Recently, a floor polish of this type based upon what is believed to be ammonium zirconyl carbonate has found wide acceptance for home use. The object of this invention is to provide a new class of detergent-resistant floor polishes which are capable of removal with common household cleaning materials, more particularly, ammoniacal cleaners. Other objects will become apparent hereinafter.

We have now found that the objects of this invention can be attained by using a floor polish composition comprising a polyvalent metal chelate and an aqueous alkaline emulsion polymer as described below. Unlike the floor polishes described in our copending application Ser. No. 471,405, now U.S. Patent 3,403,119, which are acidic and do not contain an alkali soluble resin as a leveling agent, the floor polishes of this invention are alkaline and contain an alkali soluble resin. It is believed that the combination of alkali soluble resin and polyvalent metal chelate combines to enable one to remove floor polishes based thereon with aqueous ammoniacal cleaners. In spite of being removable with ammoniacal cleaners, the floor polishes of this invention have excellent resistance to conventional ammonia-free household detergents.

The polyvalent metal chelate performs at least two functions in this invention. Some of the polyvalent metal chelate apparently reacts with free carboxyl groups of the carboxyl-containing floor polishes to render applied floor polishes based on the above-described system resistant to conventional ammonia-free detergents. Subsequently, when it is desired to remove the applied floor polish, the polyvalent metal chelate aids in the removal of the applied floor polish with a suitable ammoniacal cleaner. Superficially, these two functions appear inconsistent. However, this illustrates the selectivity of operation of the polyvalent chelates in this invention. For example, two floor polishes, which were essentially the same except that one contained polyvalent metal chelate and one did not contain this component, were applied to a suitable substrate. In each case, the synthetic polymer contained 9% by weight acid monomer units. The applied floor polish containing no polyvalent metal chelate could only be removed from the flooring using a detergent at recommended polish stripping levels with great difficulty while at recommended cleaning concentrations, the polish finish was dulled, which is indicative of partial removal. On the other hand, this same ammonia-free detergent, applied at recommended stripping levels to the applied polish containing polyvalent metal chelate, cleaned the floor and gave a lustrous shine to the polish surface. The polish was readily removable with an ammoniacal cleaner. While the detergent resistance of the polish, which did not contain polyvalent metal chelate, is improved by reducing the carboxyl content of the polymer, its subsequent removability is further impaired. Accordingly, this method of improving detergent resistance is not particularly satisfactory.

The polyvalent metal chelates useful in this invention must be at least partially soluble at the pH at which the aqueous alkaline floor polish is applied. Depending upon the solubility of the chelate, there will be some free polyvalent metal ions in the polish. As the polish film dries, the volatile base, usually ammonia, evaporates, lowering the pH of the polish film. As the pH drops, the equilibrium between polyvalent metal ions and chelated polyvalent metal shifts, increasing the concentration of polyvalent metal ions. This increase in concentration of polyvalent metal ions increases the possibility of cross-linking the carboxyl groups in the polymer system (polymer and alkali-soluble resin). The applied cross-linked polymer film is resolubilized subsequently by an ammoniacal cleaner which apparently leaches out the metal chelate and reacts with the carboxyl groups of polymer and alkali-soluble resin. The more soluble the polyvalent metal chelate the more readily the floor polish can be removed from the flooring with an ammoniacal cleaner since at some point(pH) the solubility of the chelating agent prevails over the cross-linking effect. Further, this increased ease of removability is obtained without any significant loss of desired detergent resistance.

In contrast to typical polyvalent salts of high solubility, which provide a high concentration of polyvalent metal ions, such as zinc chloride or zinc acetate, in solution, the polyvalent metal chelates of this invention provide a relatively low level of polyvalent metal ions, particularly when the pH of the polish is maintained above about 8.5. Accordingly, there is a much smaller tendency for the polyvalent metal chelates to precipitate alkali-soluble resins out of the polish than if typical readily ionizable water-soluble polyvalent metal salts are employed.

The polyvalent metal chelates of this invention contain an organic carboxylic acid moiety, a polyvalent metal moiety and in some cases, as explained below, an alkali metal moiety. While the principal function of the polyvalent metal chelate is explained above in detail, it is important to note that the organic nature of the chelate makes it compatible in the applied polish matrix. Suitable polyvalent metal groups include zinc, aluminum, titanium, zirconium, barium, calcium, magnesium, strontium, lead, cobalt, chromium, copper, cadmium, etc. The acid moiety can be formed from acids such as nitrilotriacetic acid, ethylenediaminetetraacetic acid, ethylenediaminetetrapropionic acid, propylenediaminetetraacetic acid, ethylenediaminedi-(orthohydroxyphenyl)-diacetic acid, ethylenediaminedi-(hydroxyethyl)-diacetic acid, diethylenetriaminepentaacetic acid, diaminocyclohexanetetraacetic acid, gluconic acid, etc.

Suitable polyvalent metal chelates include chelates of monoaminopolycarboxylic acids; such as disodium zinc chelate of nitrilotriacetic acid; alkylenepolyaminepolycarboxylic acids, such as disodium zinc chelate of ethylenediaminetetraacetic acid, dipotassium zinc chelate of ethylenediaminetetraacetic acid, disodium calcium chelate of ethylenediaminetetraacetic acid, hexasodium zinc chelate of di-(ethylenediaminetetraacetic acid), disodium cadmium chelate of ethylenediaminetetrapropionic acid, disodium zinc chelate of ethylenediaminetetrapropionic acid, zinc chelate of ethylenediaminedi-(orthohydroxyphenyl)-diacetic acid, zinc chelate of ethylenediaminedi-(hydroxyethyl)-diacetic acid, trisodium zinc chelate of diethylenetriaminepentaacetic acid, disodium zinc chelate of diaminocyclohexanetetraacetic acid, disodium zirconium chelate of ethylenediaminetetraacetic acid, ammonium zirconium chelate of nitrilotriacetic acid, zirconium chelate of ethylenediamine-(hydroxy)-triacetic acid, calcium gluconate, etc.

As indicated above, best results are obtained using polyvalent metal chelates of high solubility. Particularly advantageous polyvalent metal chelates meeting this requirement are the alkali metal polyvalent metal chelates of alkylenepolyaminepolycarboxylic acid containing on an average at least 1.5 alkali metal groups and preferably at least 2 alkali metal groups. The commercially available disodium zinc chelate of ethylenediaminetetraacetic acid is particularly preferred because of the excellent results obtainable therewith and availability.

The polyvalent metal chelate can comprise from about 1 to 25 parts by weight per 100 parts by weight of emulsion polymer solids. As the concentration of polyvalent metal chelate increases up to a point, the detergent resistance of the applied polish increases. However, the higher the concentration of polyvalent metal chelate, the higher the concentration of polyvalent metal ions in the formulated metal floor polish and correspondingly, the greater the tendency for reaction of polyvalent metal ions with alkali-soluble resin. This reaction, as pointed out above, results in undesirable precipitation of alkali soluble resin from the polish. Further applied polishes with above about 12 parts by weight polyvalent metal chelate per 100 parts by weight emulsion polymer solids tend to acquire a permanent blush when washed with detergent. Accordingly, it is preferred to use from about 2 to 12 parts by weight polyvalent metal chelate per 100 parts by weight emulsion polymer solids.

The emulsion polymers useful in this invention for the preparation of a removable, detergent-resistant floor polish must not be film-forming at room temperature in the absence of polish coalescing agents and polish plasticizers. For the most part these polymers are composed of three different monomeric types, i.e. "hard" monomer, "soft" monomer and free-carboxyl-containing monomer. (The terms "hard" and "soft" are used herein in reference to polymers formed from the monomers alone in the way that is common in this technology. See Riddle, Acrylic Esters, Reinhold Publishing Company, 1954, pp. 58 et seq.; also United States Patent No. 2,795,564. Generally, this refers to the "brittle-point" of the polymer, i.e. the temperature at which the polymer breaks on flexing. The "hard" monomers useful in this invention have brittle-points in excess of 20° C. and give rise to latex polymers which are not film-forming at room temperature.)

"Hard" monomer is, of course, essential for the preparation of a polymer emulsion which is not film-forming at room temperature. "Soft" monomers can be omitted, but only at the expense of using an undesirable high concentration of emulsifier. However, it is far better to use "soft" monomer since it serves to impart the proper-film-forming characteristics, i.e. it aids in forming a continuous, clear, craze-free layer which withstands normal wear, impact and flexure without cracking. The "hard" monomer imparts to the polymer and floor polish prepared therefrom the abrasion resistance normally expected of floor polish.

The free-carboxyl-containing monomer (alpha,beta-ethylenically unsaturated carboxylic acid), as pointed out above, reacts with the polyvalent metal ions furnished by the polyvalent metal chelate to form a detergent-resistant polymeric coating and subsequently aids in the removal of the polymeric material from the substrate with an ammoniacal cleaner. Suitable free-carboxyl-containing monomers include acrylic acid, methacrylic acid, ethylacrylic acid, itaconic acid, monobutyl itaconate, etc. The free-carboxyl-containing monomer can comprise from about 2 to 25% by weight of the emulsion polymer. At the low end of the range the applied polish tends to be somewhat difficult to remove from the flooring, while at the upper end of the range, the polymer tends to be overly soluble in the alkaline floor polish composition and difficulty may be experienced in insolubilizing the polish sufficiently to obtain the necessary and desirable detergent resistance. Accordingly, it is preferable to use the free-carboxyl-containing monomer in a concentration of about 5 to 15% by weight with about 8–12% being best.

Suitable hard monomers include monovinyl aromatics such as styrene and ring-substituted styrene (vinyl toluene, 2,5-dichlorostyrene); alpha,beta-ethylenically unsaturated nitriles such as acrylonitrile and methacrylonitrile; hard esters of alpha,beta-ethylenically unsaturated carboxylic acids such as methyl methacrylate, tert-butyl methacrylate, cyclohexyl acrylate, dimethyl itaconate, dimethyl maleate, etc. Of these, styrene, acrylonitrile and methyl methacrylate are preferred. While each of these hard monomers has certain advantages they also have certain disadvantages. For example, floor polishes comprised of polymers having a high concentration of monovinyl aromatics and alpha,beta-ethylenically unsaturated nitriles have excellent detergent-resistance and other properties desired in a good floor polish. The monovinyl aromatics having no saponifiable groups are particularly useful in imparting detergent-resistance to the floor polish. The polar nature of the nitrile group enhances the leveling properties of the final polish and the adhesion to new tile which can sometimes be a problem. Acrylonitrile is also advantageous because of the toughness that it imparts to the final polish. However, it has been found that polymers where acrylonitrile and styrene are the sole hard monomers are harder to remove from flooring with ammoniacal cleaners than polymers containing at least some methyl methacrylate. The hard monomer should comprise at least 50% by weight of the monomers not containing a free-carboxyl group and for best results should comprise from 65 to 90% by weight of the monomers not containing a free carboxyl group.

As indicated in the preceding paragraph, as the concentration of methyl methacrylate or any hard ester of alpha,beta-ethylenically unsaturated carboxylic acid in the polymer increases, the floor polish becomes easier to remove from the flooring with ammoniacal cleaners. At the same time the floor polish becomes less detergent-resistant, is more susceptible to water spotting and consequently must be removed or recoated sooner. However, the detergent-resistance and "floor life expectancy" of floor polishes of this invention based on polymer having a high concentration of hard ester monomer have high detergent-resistance and removal characteristics of a relatively high order when compared with the typical commercially available products.

Suitable "soft" monomers include primary or secondary alkyl esters of acrylic acid containing up to 8 carbon atoms in the alkyl group and primary or secondary alkyl esters of methacrylic acid containing from 4 to 12 carbon atoms in the alkyl group. Representative soft monomers are methyl acrylate, ethyl acrylate, isopropyl acrylate, butyl acrylate, amyl acrylate, hexyl acrylate, heptyl acrylate, 2-ethylhexyl acrylate, butyl methacrylate, amyl methacrylate, dodecyl methacrylate, etc. While the soft monomers can comprise up to about 50% by weight of the monomer not containing a free carboxyl-group, it is usually preferable that the soft monomer be used in a concentration of about 10 to 35% by weight of the total monomer not containing a free carboxyl-group. However, the maximum concentration of "soft" monomer can only be used when a suitable-polyfunctional monomer such as diethylene glycol dimethacrylate or divinylbenzene is employed as a comonomer in the polymerization system.

Briefly the aqueous copolymers of this invention can be prepared by either forming an aqueous emulsion premix, adding the monomers to be polymerized and catalysts to the emulsion premix and polymerizing said monomers or, alternatively, by emulsifying a prepared polymer. The former method is preferred since it is more convenient, yields products having more uniform properties and is susceptible of more precise control. It is particularly difficut to prepare polymers having the necessary particle size by emulsification of prepared polymer. If the average particle size of the polymer particle is more than 2 microns, the final polish lacks the gloss required of a good floor polish.

The emulsifiers useful for dispersal or emulsification of monomer or polymer may be chosen from a wide variety of nonionic surface active agents and anionic surface active agents, particularly anionic surface active agents having a polyoxyethylene chain of at least 5 oxyethylene units. Two or more surface active agents are frequently used, of one or both types. The compatibility of surface agents with the polyvalent metal chelates salts of this invention is not destroyed by the presence of an anionic group. Such surface active agent, normally have a hydrophilic anion, hydrophobic cation and may have a long-chain polyoxyethylene chain of up to 120 oxyethylene units. Typical useful surface active agents of this latter type are alkali metal salts of alkyl phenoxy polyoxyethylene ethanol sulfate esters having 5 to 120 oxyethylene units and the corresponding alkyl oxyethylene ethanol sulfate esters. In large measure, the selection of surface active agent (or agents) for the present polymer is the same as for many prior art emulsion polymerization systems.

In emulsion polymerization, the amount of surface actice agent or agents required, varies primarily with the concentration of monomers to be handled and to a minor extent with the choice of emulsifier, monomers, portion of monomers and catalysts. Generally, the amount of surface active agent used in the polymerization mixtures will range from about 4 to 25% of the total monomer weight. Lower concentrations in the range of about 1 to 4% by weight can be used. Somewhat the same principles apply in the selection of the amount of surface active agent as in the selection of the surface active agent itself. The proportion must be sufficient to impart the necessary stability, desired rate of polymerization, and particle size.

As polymerization catalysts, there may be used one or more of the peroxidic compounds better known to act as free-radical catalysts which have at least some solubility in aqueous solution of the emulsifier or which are soluble only in the monomer phase. Among the useful catalysts for the present type of copolymerization are the persulfates, ammonium, sodium and potassium salts, hydrogen peroxide and the perborates. Also useful, are the organic peroxides and hydroperoxides. These include benzoyl peroxide, tertiary butyl hydroperoxide, di-isopropyl benzene hydroperoxide, cumene hydroperoxide, caproyl peroxide, methyl ethyl ketone peroxide, etc. Other free-radial catalysts are also useful, such as azodiisobutyronitrile and other aliphatic azo compounds of the type having an acyclic azo group and an aliphatic carbon atom on each nitrogen, at least one of which is tertiary. In part, the particular combination of monomers governs the selection of the inorganic or organic peroxidic catalysts since some monomers respond better to one variety than they do to another.

The amount of peroxidic catalysts required is about proportional to the concentration of monomers used. The usual range is 0.01% to 3% of catalyst with reference to the weight of the monomer mixture. The optimum amount of catalyst is determined in large part by the nature of the particular monomer selected, including impurities (including polymerization inhibitors) which accompany particular monomers.

Frequently a promoter for the catalyst (sometimes called an "accelerator" or "adjuvant") is used to hasten the reaction at a sufficiently low temperature to avoid coagulation. The promoter may be a reducing agent and together with the peroxidic catalyst is frequently referred to as a "redox system." Many examples of such systems are known and the promoters include ascorbic acid, and soluble sulfites, hydrosulfites, sulfoxylates, thiosulfates, and bisulfites. Examples of particular promoters are sodium hydrosulfite, sodium metabisulfite, zinc or sodium formaldehyde sulfoxylate, and calcium bisulfite. Polyvalent metal ions are also used in small concentration, particularly ferrous ion in the form of ferrous ammonium sulfate at concentrations of a few parts of ferrous ion per million.

The amount of promoter required varies, as is known, with the free-radical initiator chosen and with the particular promoter. The emulsifying agent also effects somewhat the amount used as does the particular monomers. At the outside, not more than 3% or less than 0.01% is used in these situations. The preferred range of ascorbic acid is at the low end of this range up to about 0.5% while sulfites are used preferably in an amount of 0.2% to 1%.

Copolymerization is best effected below about 95° C. The preferred range is 30 to 70° C., although slightly lower (0° C.) temperatures are permissible. After most of the monomers have been converted to copolymer, temperatures even higher than 95° C. may then be applied. In fact, after most of the monomers have been copolymerized, the resulting emulsion copolymer system can be heated to boiling without breaking the emulsion. During copolymerization the temperature can be controlled in part by the rate at which monomers are supplied and polymerized and/or by applied cooling.

The polymerization process can be carried out batchwise or continuously. It is possible to work entirely batchwise, emulsifying the entire charge of monomers and proceeding with polymerization. It is usually advantageous, however, to start with part of the monomers which are to be used and add more monomer as polymerization proceeds. An advantage of gradual or stepwise addition of monomers lies in reaching a high solids content with optimum control and maximum uniformity of product. Additional catalysts or additional components of the redox system may be added as polymerization proceeds, and these can be used to control the speed of reaction to avoid overheating.

A convenient method of carrying out the polymerization utilizing the preceding principles comprises preparing separate pre-mixtures as follows: (1) a catalyst-emulsifier pre-mixture; (2) a first monomer pre-mixture; and (3) a second monomer pre-mixture which contains the balance of the monomers to be polymerized. If desired, third and fourth monomer pre-mixtures may also be employed. In this method of performing the reaction, the catalyst-emulsifier pre-mixture is preferably prepared in warm water (30–50° C.). To this, the first monomer pre-mixture is added and the polmyerization is initiated. After the reaction becomes exothermic, the second monomer pre-mixture is added over a time sufficient to permit the temperature to be controlled throughout the reaction. The same care is taken with any other monomer pre-mixtures. Additional catalysts and/or promoter is added when necessary to maintain the reaction. Finally, the reaction is permitted or forced to go to completion, which is insured (1) by raising the temperature to about 85° C., and/or (2) by the addition of additional catalysts and/or promoter.

In general, the preferred polymer emulsion resulting from the emulsion polymerization of three monomer types are acidic because of the proportion of acid co-monomer. These polymer emulsions can be shipped to the polish formulator in this condition or neutralized with a volatile alkali, such as morpholine or ammonia. The polymer emulsion can be shipped in either form neutralized or not to a floor polish formulator or it can be formulated with the other ingredients of the floor polish immediately after the formation of polymer emulsion. Generally, the polymer emulsion is shipped after the neutralization of the polymer latex. Subsequently the polyvalent metal chelate is dispersed or dissolved in water and added to the polymer emulsion. The solution or dispersion can be added hot or cold.

As indicated above, the alkali-soluble resin utilized in this invention perform their normal leveling function as in most alkaline floor polishes and also aid in subsequent removal of the floor polish. In general removability with ammoniacal cleaner is particularly enhanced by using resins having a high acid number above about 150, preferably above about 200. Suitable alkali soluble resins include shellac, alkali soluble maleic anhydride copolymers with monomers such as styrene or vinyl ethers such as methyl or ethyl vinyl ether; the product of hydroylsis of the said maleic anhydride polymers; alkyl esters of the said hydrolysis products; terpene maleic anhydride condensation products; rosin adducts of polyester of which esters glycol and glycerin succinates, adipates and maleates are examples; alkali soluble phenol-formaldehyde condensates, etc. The alkali soluble resins can be used in a concentration 1 to 40 parts by weight (preferably 10 to 35 parts by weight) per 100 parts by weight dry polymer.

The characteristic of a dried film of floor polish are improved by the addition of various additives to the polymer emulsion. One may add, for example, a wax such as carnauba wax, candelilla wax, Fischer-Tropsch wax, oxidized polyethylene wax, polyethylene emulsion, modified Montan wax or ester wax, mixtures of rosin amine in polyethylene emulsion, copolymers or ethylene with acrylate esters, etc. The primary function of wax in a floor polish is to impart certain desirable film characteristics, such as mar resistance, buffability, flexibility, etc. Further, wax may also contribute to the soap-and-water and alkali resistance of the applied polish. Wax can be used in a concentration of from about 2 to 50 parts per 100 parts by weight dry polymer.

Other additives, as are common in floor polishes, include methyl Carbitol (monomethyl ether of diethylene glycol) and/or tributoxyethyl phosphate and/or 2-pyrrolidone which act as leveling agents, softners (plasticizers) and coalescing agents, fluorinated compounds of U.S. Patent No. 2,937,098, such as FC–134 sold by Minnesota Mining and Manufacturing Company, which serve as leveling aids, etc. These leveling aids and softeners are particularly important in this invention since the polymer emulsion is not film-forming at room temperature. Additives must be employed in order to give the floor polish the necessary coalescing properties.

The various ingredients of a floor polish of this invention are formulated in water at about 8 to 20% by weight of total solids concentration. Then alkali-soluble resin and/or one or more leveling agents, coalescing agents and/or plasticizers is added to the floor polish, such as methyl Carbitol, tributoxyethyl phosphate or fluorocarbon surface active agent. The floor polish is then adjusted if necessary, to a pH of about 8 to 10, preferably about 8.5 in order to prevent coagulation of alkali soluble resin.

The floor polishes of this invention can be removed from resilient flooring easily and without any deleterious effect on the substrate. A wide variety of removers are feasible. In general, the removers comprise water, ammonia and detergent as base.

The following examples are merely illustrative and should not be construed as limiting the scope of this invention.

EXAMPLE I

A preferred emulsion copolymer for use in this invention was prepared by polymerizing under emulsion polymerization conditions 94 parts by weight 2-ethylhexyl acrylate, 150 parts by weight styrene, 120 parts by weight methyl methacrylate and 36 parts methacrylic acid using an emulsifier system comprising 14 parts by weight of the sodium salt of lauryl polyethoxysulfate containing about 50 oxyethylene groups, 8 parts by weight sodium laurylsulfate and 10 parts by weight Carbitol using a catalyst system comprising 1.5 parts by weight ammonium persulfate, 1.5 parts sodium metabisulfate, 0.05 part by weight ferrous sulfate, 0.5 part by weight t-butyl hydroperoxide and 0.1 part by weight ascorbic acid in 636 parts by weight water to form a 40% solids latex. The latex copolymer was diluted with water to 15% solids and neutralized to pH 8.5 with ammonium hydroxide.

Seventy parts by weight of the 15% solids emulsion was added to a mixture of 0.8 part tributoxyethyl phosphate and 20 parts by weight of a 15% solids alkali soluble resin solution, which was prepared from 100.0 parts by weight alkali soluble resin (Durey 19788 polyester type), 27.0 parts by weight 28% ammonium hydroxide and 539 parts water. After 5.0 parts by weight of 7.5% by weight solids aqueous disodium zinc chelate of ethylenediaminetetraacetic acid was added to the polymer-alkali resin blend there was added 10 parts by weight of a 15% solids polyethylene emulsion, prepared by mixing 100 parts by weight polyethylene, 20 parts by weight oleic acid, 20 parts by weight morpholine and 660 parts by weight water. Then 1.8 parts by weight methyl Carbitol, 0.4 part by weight 2-pyrrolidone and 0.5 part by weight FC-128, fluorinated leveling agent of U.S. Patent 2,937,098, were added and the polish was adjusted to pH 9.

EXAMPLE II

This example illustrates that the floor polishes of this invention, when compared to a polish based on a polymer containing zinc groups (Polish A) and a polish containing zirconium ammonium carbonate (Polish B) were equal or superior in performance. Table I summarizes the results of conventional bench tests. Water spotting and recoatability were evaluated on black test paper; other properties on black vinyl tile. Polishes were applied to test paper at 0.2 ml./per 8 sq. inches and at 0.4 ml./8 sq. inches to black tile. Detergent resistance was enducted using a Gardner Straight Line Washability machine and 1% Spic and Span cleaner. Removability was tested on same machine using mixtures of ¼ cup Spic and Span and 1 cup household ammonia to one gallon water.

illustrative only and our invention is defined by the claims appended hereafter.

TABLE I

| Property tested | Polish of Example I | Type A | Type B |
|---|---|---|---|
| Gloss | Excellent | Excellent | Very good. |
| Leveling | do | Very good | Do. |
| Haze | None | None | Very slight. |
| Craze | do | do | None. |
| Waterspotting (1 hr.): | | | |
| Initial | Very good+ | Very good+ | Very good. |
| Final | Excellent | Excellent | Excellent. |
| Waterspotting (24 hrs.): | | | |
| Initial | Very good | Excellent− | Very good+. |
| Final | Excellent | Excellent | Excellent. |
| Recoatability: | | | |
| Initial | Very good+ | do | Very good. |
| Final | Excellent | do | Do. |
| Wet abrasion | do | do | Excellent. |
| Removability: | | | |
| 24 hrs. (percent removal) | 100% | 50% | 100%. |
| 30 days | 100% | 10% | 80%. |

EXAMPLE III

The floor polishes tested in Example II were applied to floors and tested in the manner described in Table II below. Detergent resistance was tested by mopping the floors with several non-ammoniated household detergents. Removability was tested by mopping floors with the same cleaner described in Example II.

TABLE II

| Property tested | Polish of Example I | Product A | Product B |
|---|---|---|---|
| Recoatability | Excellent | Very good | Very good. |
| Gloss | | | |
| Initial | Very good+ | do | Very good. |
| 3 weeks | Excellent | do | Do. |
| Appearance, initial | Very good | Good | Very good−. |
| Heel marking 3 wks | Good | do | Fair. |
| Dirt pickup 3 wks | do | do | Good. |
| Scuffing 3 wks | do | do | Do. |
| Slip resistance | Excellent | Excellent | Excellent. |
| Detergent resistance | Very good+ | do | Very good. |
| Removability (1%) | 100% | 15% | 95%. |

Examples II and III clearly show that the polishes of this invention have the normally desired floor polish properties in addition to removability and excellent detergent resistance.

EXAMPLE IV

A floor polish having the desired detergent resistance and removability characteristics was prepared in the manner described in Example I using 5 parts of a 15% solids aqueous disodium zinc chelate of ethlenediamine-tetraacetic acid and a copolymer (Tg 50° C.) prepared by emulsion polymerization of 23.5 parts 2-ethylhexyl acrylate, 50 parts styrene, 17.5 parts acrylonitrile and 9.0 parts methacrylic acid using a redox catalyst system and 2.0 parts sodium laurylsulfate and 3.5 parts of the sodium salt of laurylpolyethoxysulfate.

EXAMPLE V

A floor polish having the desired detergent resistance and removability characteristics was prepared in the manner described in Example I using 6 parts by weight of a 6% solids aqueous zirconium (tetravalent) chelate of ethylenediaminetetraacetic acid.

EXAMPLE VI

A floor polish having the desired detergent resistance and removability characteristics was prepared in the manner described in Example I using 5 parts by weight of a 7.5% solids aqueous zirconium (tetravalent) chelate of ethylenediamine-(hydroxyethyl)-triacetic acid which had been adjusted to pH 9.5 with ammonia prior to addition to the polymer solids.

Since many embodiments of this invention may be made and since many changes may be made in the embodiments described, the foregoing is to be interpreted as illustrative only and our invention is defined by the claims appended hereafter.

We claim.

1. An alkaline floor polish composition comprising (1) an aqueous emulsion of a synthetic addition copolymer, said copolymer comprising from about 2 to 25% by weight of a alpha, beta-ethylenically unsaturated carboxylic acid and correspondingly from 98 to 75% by weight of at least one additional ethylenically unsaturated monomer of which at least 50% by weight is a hard monomer selected from the group consisting of monovinyl aromatic compound, alpha,beta-ethylenically unsaturated nitrile and alkyl ester of alpha,beta-ethylenically unsaturated carboxylic acid and (2) a water-soluble polyvalent metal chelate of an organic acid wherein the acid moiety is selected from the group consisting of monoaminopolycarboxylic acid, alkylenepolyaminopolycarboxylic acid and gluconic acid, said polyvalent metal chelate of an organic acid comprising from about 1 to 25 parts by weight per 100 parts by weight emulsion copolymer solids, said composition being non-film forming at room temperature in the absence of polish coalescing agents and polish plasticizer.

2. The composition of claim 1, wherein said water-soluble polyvalent metal chelate of an organic acid is a polyvalent metal chelate of an alkylenepolyaminepolycarboxylic acid.

3. The composition of claim 1, wherein said water-soluble polyvalent metal chelate of an organic acid is a polyvalent metal chelate of an alkylenepolyaminepolycarboxylic acid containing on an average at least 1.5 alkali metal groups.

4. The composition of claim 3, wherein said water-soluble polyvalent metal chelate is a sodium zinc chelate of ethylenediaminetetraacetic acid.

5. The composition of claim 1, wherein said polish contains an alkali-soluble resin having an acid number of at least 150.

6. 9 floor polish composition having a pH of at least 8.5 comprising (1) an aqueous emulsion of a synthetic addition copolymer comprising from about 5 to 15% by weight of an alpha,beta-ethylenically carboxylic acid and correspondingly from about 85 to 95% by weight of at least one additional ethylenically unsaturated monomer of which at least 50% by weight is a hard monomer selected from the group consisting of monovinyl aromatic compound, alpha,beta-ethylenically unsaturated nitrile and alkyl ester of alpha,beta-ethylenically unsaturated carboxylic acid and (2) a water-soluble polyvalent metal chelate of an organic acid wherein the acid moiety is selected from the group consisting of monoaminopolycarboxylic acid, alkylenepolyaminepolycarboxylic acid and gluconic acid, said polyvalent metal chelate of an organic acid comprising from about 1 to 25 parts by weight per 100 parts by weight emulsion copolymer solids, (3) an alkali soluble resin and (4) wax, said composition being non-film forming at room temperature in the absence of polish coalescing agents and polish plasticizer.

7. The composition of claim 6, wherein said alkali soluble resin has an acid number of at least 150 and comprises from 10 to 35 parts by weight per 100 parts by weight of emulsion copolymer solids and said wax comprises from about 2 to 50 parts by weight per 100 parts by weight emulsion copolymer solids.

8. The polish of claim 7, wherein said emulsion copolymer comprises a hard monomer and a soft monomer in a weight ratio of from 65 to 90% hard monomer to 35 to 10% soft monomer.

9. The polish of claim 8, wherein said water-soluble polyvalent metal chelate of an organic acid is a polyvalent metal chelate of an alkylenepolyaminepolycarboxylic acid containing on an average 1.5 alkali metal groups.

10. The polish of claim 8, wherein said water-soluble polyvalent metal chelate of an organic acid is a sodium zinc chelate of ethylenediaminetetraacetic acid.

11. The polish of claim 9, wherein said alkali-soluble resin has an acid number of at least 200.

References Cited

UNITED STATES PATENTS 3,328,325   6/1967   Zdanowski _____ 260—28.5

OTHER REFERENCES

Martell and Calvin,—"Chemistry of the Metal Chelate Compounds" (Prentice-Hall) (1952), p. 511.

ALLAN LIEBERMAN, Primary Examiner

H. H. FLETCHER, Assistant Examiner

U.S. Cl. X.R.

117—161; 260—24, 30.2, 30.6, 33.2, 82.3, 83.5, 83.7, 429